United States Patent [19]

Lewis, Jr.

[11] 4,281,900
[45] Aug. 4, 1981

[54] FRONTAL REFLECTOR BRACING

[75] Inventor: I. Earl Lewis, Jr., Menlo Park, Calif.

[73] Assignee: Ford Aerospace & Communications Corp., Detroit, Mich.

[21] Appl. No.: 90,151

[22] Filed: Oct. 31, 1979

[51] Int. Cl.³ .......................... G02B 5/10; G02B 7/18
[52] U.S. Cl. .................................... 350/292; 126/438; 126/451; 343/840; 350/296; 350/310
[58] Field of Search .............. 350/292, 293, 296, 310; 343/912, 915, 878, 840; 126/438, 439, 451

[56] References Cited

U.S. PATENT DOCUMENTS

| | | | |
|---|---|---|---|
| 1,683,270 | 9/1928 | Taylor et al. | 343/878 X |
| 2,909,171 | 10/1959 | Löf | 126/451 |
| 2,997,712 | 8/1961 | Kennedy | 343/916 |
| 3,397,399 | 8/1968 | Carman et al. | 343/915 |
| 3,438,039 | 4/1969 | Altmann | 343/912 X |
| 3,558,219 | 1/1971 | Buckingham et al. | 350/292 |
| 3,707,720 | 12/1972 | Staehlin et al. | 343/915 X |
| 3,906,927 | 9/1975 | Coplan | 350/310 X |
| 3,945,015 | 3/1976 | Guequen | 343/912 X |
| 3,998,206 | 12/1976 | Jahn . | |
| 4,161,942 | 7/1979 | Monk | 350/310 |
| 4,171,876 | 10/1979 | Wood | 126/438 X |

Primary Examiner—F. L. Evans
Attorney, Agent, or Firm—Peter Abolins; Edward J. Radlo; Clifford L. Sadler

[57] ABSTRACT

This specification discloses a frontal reflector bracing wherein at least a portion of the support for a reflecting surface is positioned on the front side of the surface and the rearward most support is adjacent the reflecting surface. A natural structural rigidity minimizing weight can be achieved with a frontal truss arrangement including radial components.

10 Claims, 18 Drawing Figures

FRONTAL REFLECTOR BRACING

BACKGROUND OF THE INVENTION

1. Field of the Invention

This invention relates to reflectors for energy collectors, such as microwave antennas and solar concentrators; and, more particularly, to support systems for the reflector.

2. Prior Art

In a paraboloidal reflector, incoming parallel rays are concentrated upon a focal point in front of a reflective surface. In a Gregorian system the incoming energy is utilized at the focal point. In a Cassegranian system, there is a "double bounce" and the energy from the focal point is reflected back to the center of the reflector. The Cassegranian system may be particularly desirable in situations where the reflector is utilized by relatively bulky components such as microwave horns and it is desired to position these behind the reflector and not suspended at the focal point. In either case, the Gregorian or the Cassegranian, there must be a reflector and an energy utilizing device at the focal point. When conventional rear reflective surface bracing is used, the object at the focal point is often supported by a tripod or quadripod extending from the reflector on relatively long legs. The bracing for these legs and the reflective surface extends around the rear of the reflective surface.

As reflector sizes have increased in size and weight, there has been an attendant increase in the size and weight of the reflector bracing and support structure. The increase in the weight of the reflector support structure produces cost and weight penalties which would be desirable to avoid. For example, in U.S. Pat. No. 2,997,712 issued to D. S. Kennedy there is taught a system for building a sectional reflector support for use behind the reflective surface. Although disassembly of the support structure into sections facilitates transportation, the support structure itself is still undesirably heavy and expensive. Further, the support structure is positioned between the reflective surface and a pivot point to the rear of the reflective surface, thus extending the moment arm from the pivot point to the reflective surface and increasing the torque required to turn the reflective surface.

One variation in reflector surface supports is taught in U.S. Pat. No. 3,558,219 issued to H. E. Buckingham et al. and includes an erectable umbrella-like reflector surface which has a hub with a plurality of hinged radial arms attached at one end of the hub. The arms have rigid segments between which extend a thin flexible reflector membrane. The reflector is supported about an axial rigid member extending through the hub from which extend tension members for supporting the reflective surface. However, this does not solve the problem of a simplified reflector support for a noncollapsable structure with a paraboloidal reflector. These are some of the problems this invention overcomes.

SUMMARY OF THE INVENTION

This invention recognizes that the support for a reflector can be positioned on the front or energy receiving side of the reflective surface. Further, the invention recognizes that even increasing the diameter of the reflective surface to compensate for the shadowing of this surface by the support structure results in a net saving of weight and produces various other benefits. For example, there is more rigidity with less weight than a rear support system, the axes of rotation of the energy collector can be positioned closer to the reflective surface and thus closer to the center of gravity of the reflector thereby minimizing the moment of inertia, and the focal point receiver, or other apparatus, can be supported on a shorter structure which is simple, less expensive and more rigid.

Locating the structural members of a paraboloidal reflector in front of the reflective surface and therefore obtaining direct load paths from rim to rim with a deep truss, provides inherent stiffness and strength over the conventional manner of positioning the members behind the surface. Reflector material weight and therefore cost is reduced under the maximum wind force loading condition. Typically, this weight reduction is shown to be 20%. Additionally the reflector distortions that produce surface scope deviations under operating gravity and wind conditions are shown to be less for the front braced concept than a conventional rear braced structure.

The other advantages of frontal bracing in accordance with an embodiment of this invention include:

1. Further reflector weight reductions by taking advantage of reduced wind forces due to the elimination of the back structural members.

2. Since the reflector is located closer to the concentrator's axes of rotation, moment loads such as gravity and wind, to the pedestal support are reduced by approximately 25%.

3. The receiver support extending from the reflector bracing is shorter and therefore less weight to maintain the rigid relationship between reflective surface and the focal point receiver.

4. The lower profile and elimination of back structural members improves aesthetic appearance.

The front braced reflector has increased blockage of approximately 4½%. However this additional blockage does not significantly diminish the overall advantages of the front braced concept.

In one particular embodiment of this invention, the frontal bracing structure includes members with a primarily radial orientation which minimizes the amount of blockage of incident energy by the support structure. That is, the shadowing of energy is minimized by maintaining the support structure primarily in line with the energy path from aperture to reflecting surface to focus. Thus, one support member interferes with only one energy path.

DETAILED DESCRIPTION OF THE INVENTION

Figure 1:
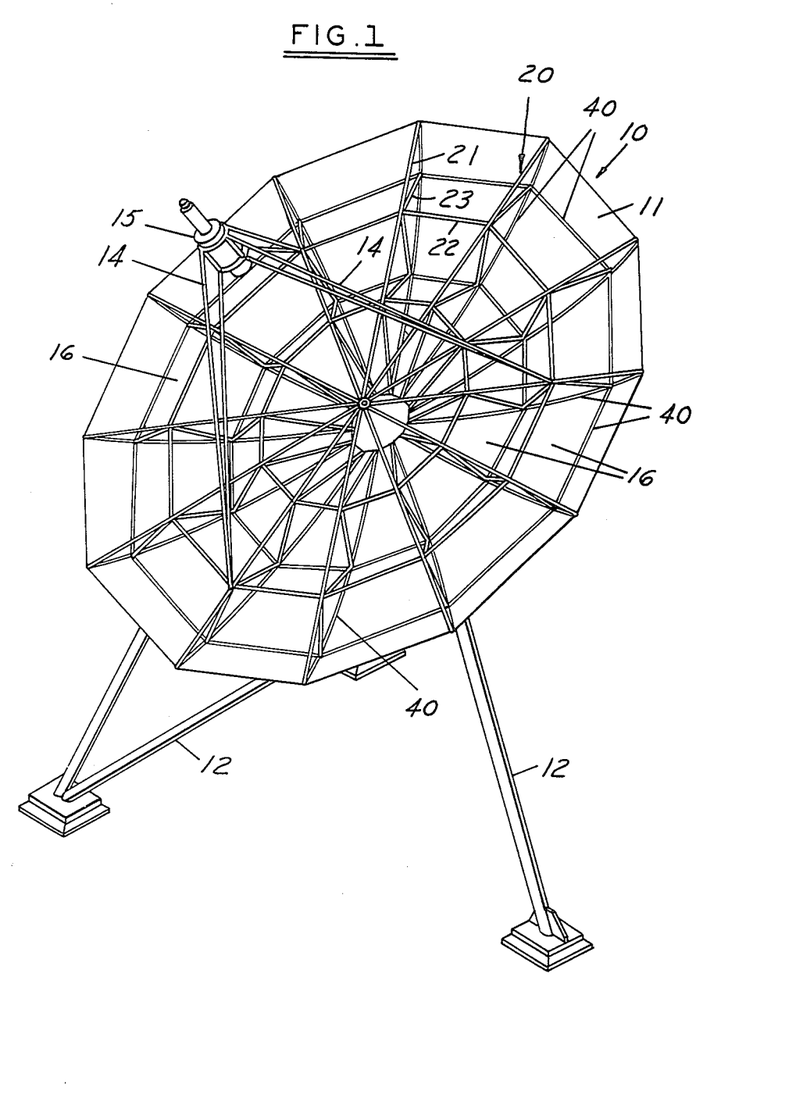
FIG. 1 is a perspective view of a frontal bracing system in accordance with an embodiment of this invention.
Figure 3:
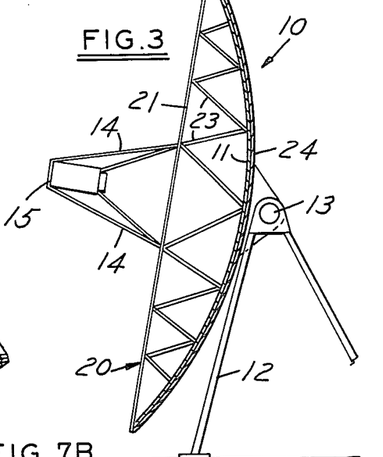
FIG. 3 is a sectional view through the center of a reflector with bracing in accordance with an embodiment of this invention.

Referring to FIGS. 1 and 3, a reflector system 10 includes a frontal bracing 20 which provides a frontal, rim to rim support for a symmetrical paraboloidal reflector surface 11. A support 12 is connected to reflector system 10 at a pivot joint 13 so that pivot joint 13 is directly adjacent reflective surface 11.

Figure 2:
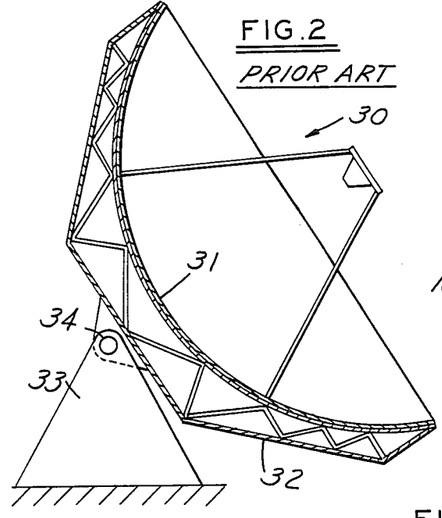
FIG. 2 is a sectional view of a prior art reflector using bracing positioned behind the reflective surface.

Referring to FIG. 2, a prior art reflector system 30 includes a reflector surface 31 and a rear bracing 32. Rear bracing 32 is coupled to a support 33 at a pivot joint 34. Reflector surface 31 is spaced from pivot joint 34 by the rear bracing 32 thus adding to the moment arm extending from pivot joint 34 to the center of gravity of rear bracing 32 and reflector surface 31.

Figure 4:
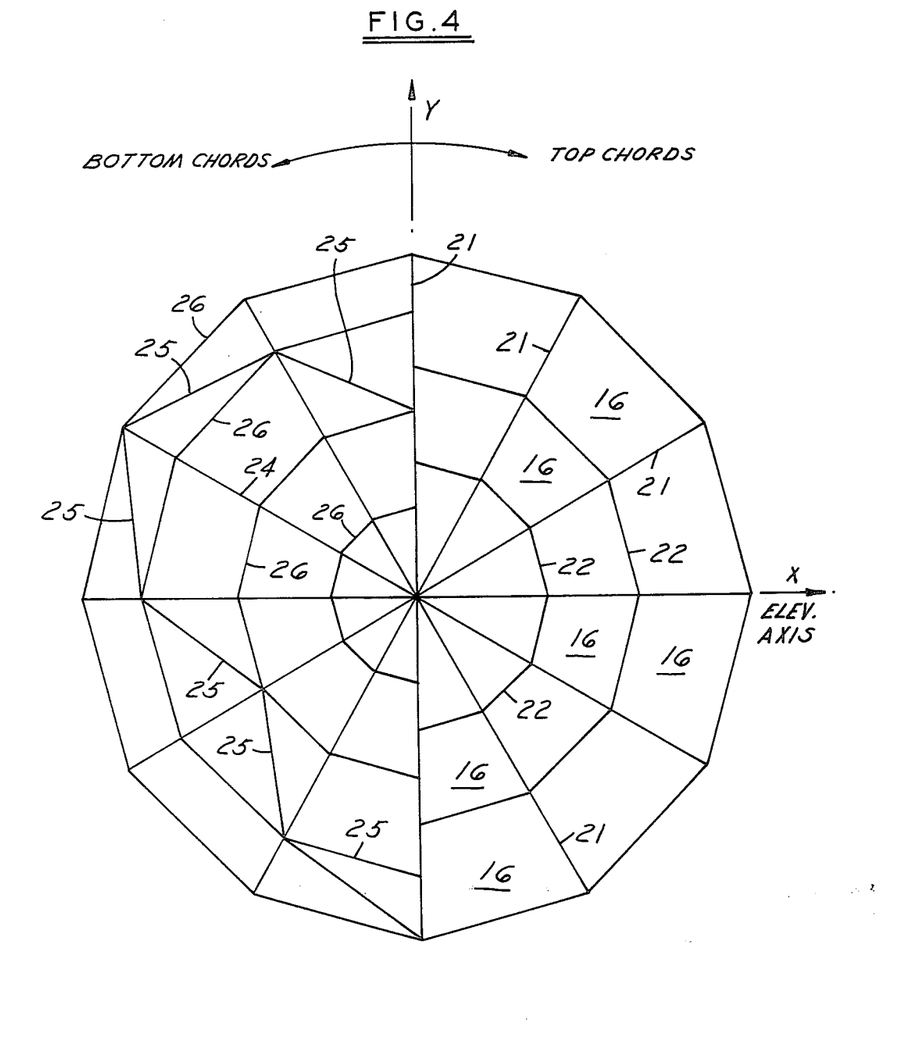
FIG. 4 is a front elevational view of the reflector bracing system of FIG. 3 in accordance with an embodiment of this invention with the left half showing the back support members and the right half showing the front support members of a frontal bracing system in accordance with an embodiment of this invention.
Figure 5:
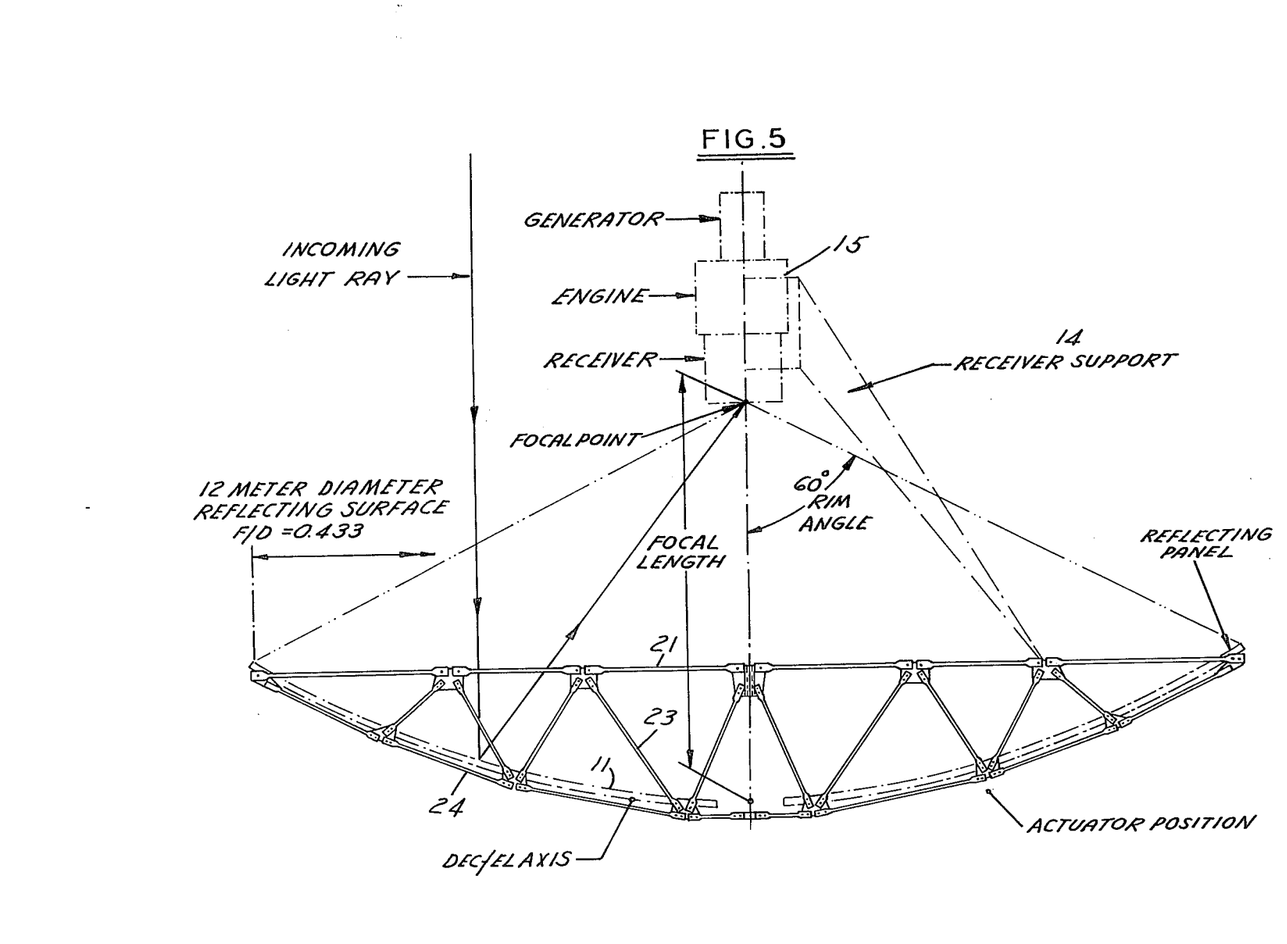
FIG. 5 is an enlarged view similar to FIG. 3 including a focal point receiver and receiver support.

Referring to FIG. 4, radial front members 21 extend as diameters across the front of reflector surface 11 and circumferential front members 22 are generally straight components extending between corresponding positions on radial front members 21. FIGS. 3 and 5 show truss members 23 extending between radial front members 21 and radial back members 24. Typically, reflective surface 11 includes a plurality of reflector surface panels 16 supported by a dish shaped grid of radial back members 24 and circumferential back members 26, wherein circumferential back members 26 are generally straight components extending between corresponding positions on radial back members 24. Extending outwardly from radial front members 21 are structural members 14 for supporting a component 15 at the focal point of reflector surface 11. For example, component 15 can be a solar receiver when reflector surface 11 is used to gather incoming sunlight.

Referring to FIGS. 4 and 5, incoming radiation striking reflector surface 11 has a radial component guiding it to the focal point of reflector surface 11. Radial front members 21 of frontal bracing 20 follow this radial component so that only energy incident along a radial front member 21 is blocked from striking reflector surface 11. By minimizing the nonradial components of frontal bracing 20, the amount of shadowing of reflective surface 11 by frontal bracing 20 can be minimized. Calculations show that when enlarging the diameter of reflector surface 11 to compensate for the shadowing by frontal bracing 20 so that the energy received by reflective surface 11 is the same as that received by reflector surface 31, frontal bracing 20 still has less weight than rear bracing 32. For example, to maintain a reflective area of 108 m², the diameter across the antenna is increased from 12.0 m, using back bracing, to 12.3 m, using frontal bracing.

Surface reflector panels 16 are located immediately in front of the bottom chord of radial back members 24.

The receiver and power conversion equipment (engine and generator components 15) are located at the focal point and a support with members 14 attaches to radial front members 21 which connect to support 12 with two axis bearings and an actuator. FIG. 4 shows an embodiment with twelve radial front members 21, two rings of circumferential front members 22, twelve radial back members 24, four rings of circumferential back members 26, and torsional members 25. Structural steel tubing with galvanizing can be used for the front braced design.

DESIGN ANALYSIS

Analysis comparing frontal bracing with rear bracing shows improvement over the distortion of reflector surface 11 with respect to vertical and horizontal loads (such as gravity) as indicated by the following table. Referring to FIG. 5, vertical gravity is defined as being a force parallel to the axis of the paraboloid reflector. Horizontal gravity is a force perpendicular to that.

| SLOPE CHANGE OF REFLECTOR SURFACE | | | |
|---|---|---|---|
| | Rear Bracing | Front Bracing | Approx Area Weighting Factor |
| VERT. GRAVITY | | | |
| Panel #1 | −1.0 Sec. | −3.0 Sec. | 54 |
| 2 | 16.0 | 10.0 | 149 |
| 3 | 18.0 | 10.0 | 223 |
| 4 | 22.0 | 12.0 | 285 |
| Weighted Average | 17.9 Sec. .0050° | 10.3 58% .0029° | 711 |
| HORIZ. GRAVITY | | | |
| Panel #1 | 0.0 | 0.0 | |
| 2 | 16.0 | 7.0 | |
| 3 | 20. | 8.0 | |
| 4 | 25. | 9.0 | |
| | 19.6 | 7.6 39% | | wherein the panel numbers 1, 2, 3 and 4 are portions of reflector surface 11 and spaced in a typical radial arrangement. The weighting factor indicates area of each panel compared to total aperture and the percentages indicate slope error of front bracing reflector compared to rear bracing reflector.

The following table presents the comparison of the various parameters for a rear braced structure and a corresponding front braced structure. These data indicate that the front braced structure is approximately 18% lighter in weight (and hence less expensive) and has better performance in terms of slope error and pointing error than the rear braced structure. When comparing the rear and front braced reflector structures each is provided with the same solar energy collecting capability, i.e., equivalent aperture which is a function of the aperture blockage.

TABLE 2.2-1

| PARAMETER COMPARISON | | | | |
|---|---|---|---|---|
| | Rear Braced Structure | | Front Braced Structure | |
| PARAMETER | Outboard Supports | Inboard Supports | Outboard Supports | Inboard Supports |
| Weight (lb.) Reflector/Tripod | 4200 | 4500 | 3600 | 3700 |
| Worse Case Slope Error (mrad) | | | | |
| Radial | .2 | .3 | .2 | .3 |
| Tangential | .4 | .7 | .3 | .4 |
| Worse Case Absolute | | | | |

TABLE 2.2-1-continued

PARAMETER COMPARISON

| PARAMETER | Rear Braced Structure | | Front Braced Structure | |
|---|---|---|---|---|
| | Outboard Supports | Inboard Supports | Outboard Supports | Inboard Supports |
| Pointing Error (mrad) | | | | |
| Gravity | 1.2 | 1.8 | .8 | .8 |
| Wind | .3 | .5 | .2 | .2 |

The loads acting on the structure are induced primarily by gravity, wind and thermal effects. The wind loads on the structure are derived from pressure distribution data obtained from wind tunnel tests. The structure gravity loads, external gravity loads (from panels 16 and receiver 15) and thermal loads are applied. Each structure was modeled and analyzed as a pin-jointed, three-dimensional truss.

Two models of the rear braced structure were analyzed: one represents a structure supported about mid-radius on three of the radial back members (designated outboard support configuration) while the other represents a structure supported about the quarter radius point on the same set of radial back members (designated inboard support configuration). The structure was designed to survive (in the stowed position) in 40 m/s winds with a minimum factor of safety against material yielding of 1.1; this design philosophy was applied to both the outboard and inboard support configurations. The analyses were performed for a 12 meter diameter reflector structure.

As with the rear braced structure, two different support conditions in the front braced structure were analyzed; these represent the same locations for the supports as defined above. The same load combinations previously evaluated for the rear braced structure were used in the determination of the survivability, the slope errors and the pointing errors for the front braced structure.

SOLAR BLOCKAGE

Solar blockage occurs due to any obstruction in the path of the rays from the sun to reflector surface 11 and then also to a receiver in component 15 at the focal point. For the conventional rear braced reflector, these obstructions are the equipment at the focal point (i.e., receiver, engine and generator package) and the structural support for this equipment. For the front braced reflector, these are the obstruction of the same equipment at the focal point, a smaller receiver support, and the additional obstructions of the front bracing members.

Blockage loss is considered to be the total area of obstructions as a percentage of the total concentrator aperture area $((\pi D^2)/4$ where D is the average surface diameter). Shading of the surface by an external object (i.e., another concentrator at low elevation angles) is a separate consideration and is not relevant to this blockage discussion.

Primary solar blockage is the direct shadow when the obstruction blocks the sun's rays from reaching reflector surface 11. Secondary solar blockage occurs when the obstruction blocks the reflected sun's rays from reaching component 15 at the focal point. The attachment location of member 14 is a variable in determining its total blockage. For purposes of comparison between front and rear bracing, the radial distances to the attachment point are assumed to be held constant. However, the width of member 14 is reduced for the front braced reflector concept since it is actually shorter.

Figure 6:
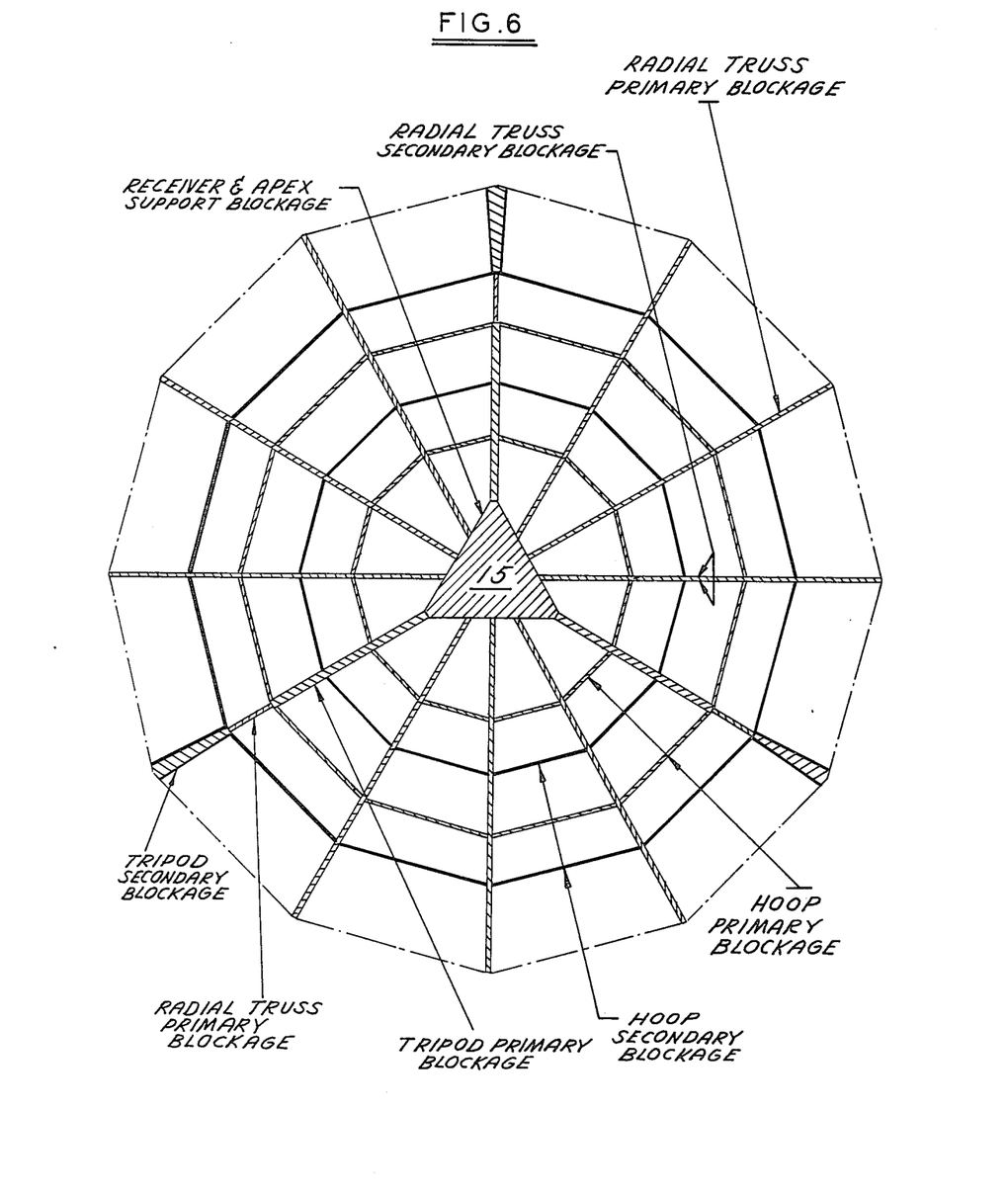
FIG. 6 is a plan view of the structure of FIG. 1 with the areas of primary and secondary solar blockage indicated.

The total blockage pattern for the reflector is shown in FIG. 6 for a 12 meter diameter concentrator. The receiver support at the apex is shown as a triangular frame, but whether circular or triangular, it has minor impact on blockage.

Another solar blockage consideration is the fact that the sun is not a point source, but has a finite diameter approximately $\frac{1}{2}°$. An analysis of the solar umbra and penumbra regions follows.

Figure 7A:
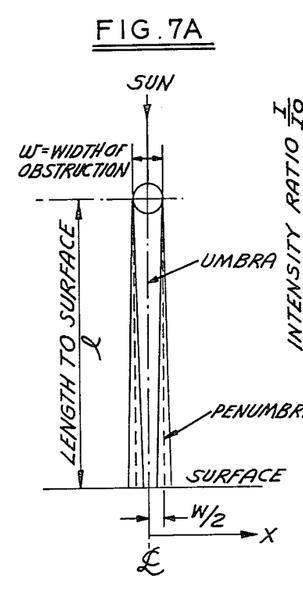
FIG. 7A is a diagram illustrating the relationship between the penumbra shadow and the distance between the object causing the shadow and the surface on which the shadow is cast.
Figure 7B:
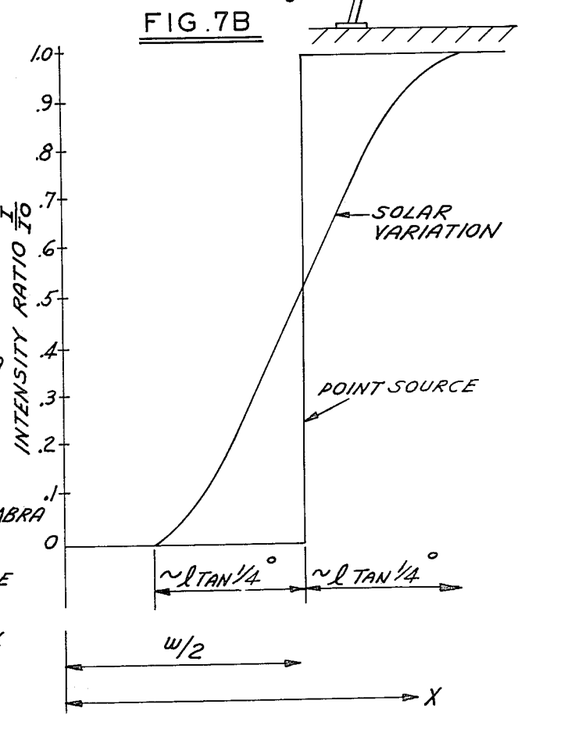
FIG. 7B is a graph of the variation of solar illumination versus the distance to the center line of the obstruction.
Figures 8A, 8F:
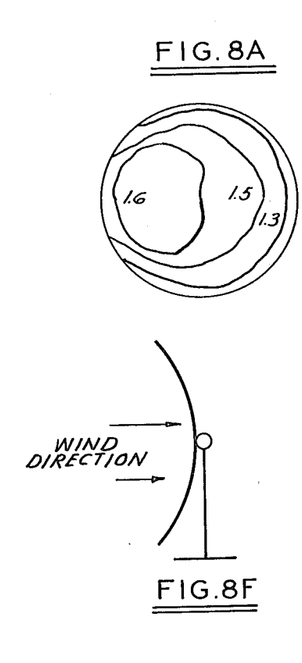
FIGS. 8A, 8B, 8C, 8D and 8E are wind pressure distribution diagrams relating to the wind direction and reflector positions as shown in FIGS. 8F, 8G, 8H, 8I and 8J, respectively.
Figure 8B:
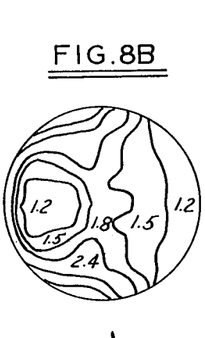
Figures 8C, 8D, 8H, 8I:
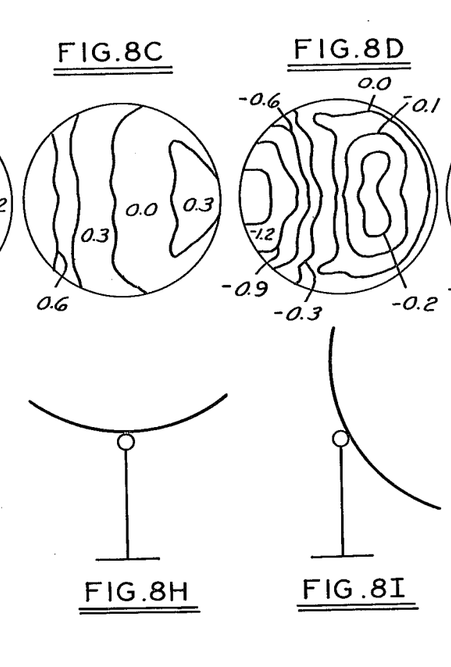
Figures 8E, 8J:
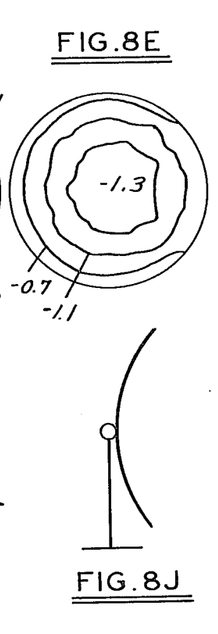
Figure 8G:
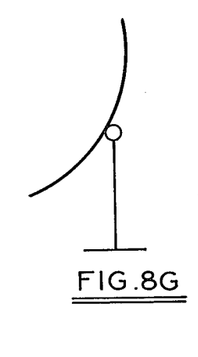

Solar shadows are composed of two regions, the umbra and the penumbra (FIG. 7A). The umbra is the region of nearly zero intensity for opaque interceptors, while the penumbra is the region wherein the intensity varies from close to zero up to the magnitude of the illumination source. FIG. 7A illustrates the penumbra shadow effect related to the width of the obstruction and to the length to the surface while FIG. 7B shows the solar intensity variation at the surface within the penumbra region compared to that from a point source.

Solar blockage will also vary with the concentrator axis angle to the sun. However, this effect is negligible with a tracking accuracy of about 2 milliradians (0.1 degree).

The summation of the calculations of total solar blockage for a 12 meter diameter concentrator are displayed in the following table, for both the conventional rear braced reflector and the front braced reflector. As shown, the front braced configuration produces an additional 4.6% blockage.

Another feature of the front braced concept is the use of gaps 40 (FIG. 1) between surface panels. The panels are oriented such that gaps 40 fall into the solar blockage areas, which saves actual mirror material, reduces tight field setting tolerances, and provides an aerodynamic advantage with wind force relief to the reflector.

| SOLAR BLOCKAGE CALCULATION SUMMARY (12 Meter Diameter - 113 M² Aperture Area) | | | | |
|---|---|---|---|---|
| Reflector Support Concept | Primary Blockage | Secondary Blockage | Total Blockage | % of Aperture |
| Front-Braced Reflector* | | | | |
| Receiver Equipment | 2.03 M² | — M² | 2.03 M² | 1.80% |
| Tripod Legs | 1.06 | 0.79 | 1.85 | 1.64 |
| Radial Trusses | 2.67 | 0.75 | 3.42 | 3.02 |
| Hoop Members | 1.11 | 1.71 | 2.82 | 2.50 |
| | 6.87 M² | 3.25 M² | 10.12 M² | 9.0% |
| Conventional Back-Braced Reflector** | | | | |
| Receiver Equipment | 2.04 M² | — M² | 2.04 M² | 1.81% |
| Tripod Legs | 1.89 | 1.03 | 2.92 | 2.58 |
| | 3.93 M² | 1.03 M² | 4.96 M² | 4.4% |

*(Net Aperture area = 102.9 M²)
**(Net Aperture Area = 108.2 M²)

WIND LOADS

When the conventional rear bracing members are eliminated and the front braced concept it utilized, the critical wind forces are greatly reduced on all components of the concentrator from the reflector structure, through the structural and mechanical components of the pedestal, to the foundation. The rear braced structure shows no effect for front and rear wind directions (axial forces at 0° and 180° yaw angles). However, a significant effect is recorded for side winds (lateral force at 90° yaw angle) whereas in the front braced structure the reflector shows 40% less force. This condition applies particularly to the design attitude of survival (e.g., maximum applied wind loads) in the stowed zenith position. The previously mentioned gaps 40 reduce the front (axial at 0° elevation) wind force, but not the rear (axial at 180° elevation) wind force, and reduce both force and moment extreme slope variations at 60° and 120° positions. FIGS. 8A-8J show wind pressure distribution diagrams relating to the indicated wind directions and reflector positions.

RELATIONSHIP TO PEDESTAL SUPPORT

An additional benefit contributed by the front braced reflector concept is the reduction in loads that are transmitted to pedestal 12. As described earlier, the weight of reflector system 10 and tripod members 14 is less but an even greater benefit develops because the reflector surface moves closer to the axes of rotation as shown in FIGS. 2 and 3. All gravity moments are reduced as shown in the following table, where the unbalance gravity moment for the front braced concept is 25% less than the moment for a conventional rear braced structure.

The closer location also reduces operating and survival wind moments for a combined reduction in forces on structural and mechanical components of the pedestal and foundation.

| GRAVITY UNBALANCE OF REFLECTOR ASSEMBLY ABOUT ELEVATION AXIS | | | | |
| --- | --- | --- | --- | --- |
| Rear Braced Structure | | | | |
| Reflector Structure | 3850 Lb | × 6.1 Ft | = | 23.5 Ft Kips |
| Tripod Support | 650 | × 14.6 | = | 9.5 |
| Reflective Panels | 3160 | × 8.1 | = | 25.6 |
| Receiver Power Unit | 2500 | × 27.5 | = | 68.7 |
| | | Unbalance Moment | | 127.3 Ft Kips |
| Front Braced Structure | | | | |
| Reflector Structure | 3200 Lb | × 4.7 Ft | = | 15.0 Ft Kips |
| Tripod Structure | 500 | × 11.1 | = | 5.6 |
| Reflective Panels | 3160 | × 4.6 | = | 14.5 |
| Receiver/Power Unit | 2500 | × 24.0 | = | 60.0 |
| | | Unbalance Moment | | 95.1 Ft Kips |

Various modifications and variations will no doubt occur to those skilled in the various art to which this invention pertains. For example, the particular symmetry of frontal bracing 20 may be varied from that disclosed herein. These and all variations which basically rely on the teachings through which this disclosure has advanced the art are properly considered within the scope of this invention.

What I claim is:

1. A reflector system having a generally dish-shaped concave reflective surface and further comprising a frontal bracing system with front members extending between points positioned generally in a plane covering the opening of said dish shaped concave reflective surface, and back radial members, positioned adjacent said reflective surface on the convex side thereof, having an orientation generally following the curvature of said reflective surface of said reflector system, a plurality of rigid bracing truss members connecting said front members and said back radial members so that a portion of said frontal bracing system is positioned on the energy receiving and transmitting side of said reflector and provides a structural support for said reflective surface;
   wherein each of said back radial members extends across substantially the entire diameter of said reflective surface.

2. A reflector system as recited in claim 1 wherein said front members include front radial members generally radial in direction, and further comprising front circumferential members extending between said front radial members at radially spaced positions so that there is additional support for said frontal bracing system; and said reflective surface is paraboloidal.

3. A reflector system as recited in claim 2 wherein a pivot joint for said reflector system is connected to said frontal bracing system adjacent said reflective surface thereby minimizing the moment arm between said pivot joint and said reflective surface.

4. A reflector system as recited in claim 3 further comprising a support member extending from said front members so that an object can be supported at the focal point of said paraboloidal reflective surface.

5. A reflector system as recited in claim 1 wherein there are associated groups of said front members, back radial members and truss members aligned along the same radial direction thereby minimizing the shadowing effect of said frontal bracing system on said reflective surface.

6. A reflector system as recited in claim 5 wherein said reflective surface is made of a plurality of rigid segments, wherein each segment is a section of a paraboloid, with at least some radially adjacent segments having a gap therebetween so as to reduce wind loads on said reflector system, said gaps being generally aligned with portions of said frontal bracing system so that said gaps are generally in the shadows of portions of said frontal bracing system and therefore do not further reduce reflected energy.

7. A reflector system as recited in claim 6 further comprising back circumferential members joining back radial members in a ring-like fashion, said back circumferential and radial members being positioned on the convex side of said reflective surface;
   wherein each of said back circumferential members is comprised of a plurality of substantially identical straight submembers.

8. A reflector system as recited in claim 7 further comprising straight torsional members extending between back circumferential and radial members for increasing the rigidity of said reflector system.

9. A reflector system having a paraboloidal concave reflective surface and a frontal bracing system with front members extending substantially directly from one point to another point on the rim of said reflective surface thus providing substantially direct load paths for rim support, back members generally positioned adjacent said reflective surface and oriented to generally follow the curvature of said reflective surface and truss members extending generally between said front members and said back members,
   said front members including radial front members extending generally radially across the opening of said reflective surface;
   said truss members oriented to lie underneath said front members with respect to incoming energy along a direction parallel to the central axis of said reflective surface so as to minimize energy blockage;

said front members including circumferential front members in the plane of said radial members;

said back members being positioned on the convex side of said reflective surface;

said reflective surface including gaps generally aligned with said front members along lines parallel to the central axis of said reflective surface to minimize the loss in energy gathering capability of said reflective surface and yet reduce the weight of said reflective surface; and said truss members having at least alternate sequential members which are angled with respect to the central axis of said paraboloidal reflective surface.

10. A reflector system as recited in claim 9 wherein said back members include radial back members extending generally radially, wherein each of said radial back members extends across substantially the entire diameter of said reflective surface;

circumferential back members extending generally circumferentially and intersecting said radial back members, each of said circumferential back members being comprised of a plurality of substantially identical straight submembers; and straight torsional back braces extending between intersection points of said radial and circumferential back members for further rigidifying said reflector system.

* * * * *